United States Patent
Joly et al.

(10) Patent No.: US 7,162,034 B1
(45) Date of Patent: Jan. 9, 2007

(54) METHOD AND APPARATUS FOR MULTI-SESSION TIME-SLOT MULTIPLEXING

(75) Inventors: Christophe Joly, Mountain View, CA (US); Muhammad Raghib Hussain, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1339 days.

(21) Appl. No.: 09/753,281

(22) Filed: Dec. 29, 2000

(51) Int. Cl.
*H04K 1/04* (2006.01)
*H04N 7/167* (2006.01)
*H04L 9/32* (2006.01)

(52) U.S. Cl. .................... 380/37; 380/212; 713/189

(58) Field of Classification Search ................ 380/212, 380/259–261, 37, 265; 713/150, 174, 189; 714/736, 739; 710/1, 20–21; 370/229–230, 370/235, 400
See application file for complete search history.

(56) References Cited

U.S. PATENT DOCUMENTS

| | | | | |
|---|---|---|---|---|
| 4,897,876 A | * | 1/1990 | Davies | 380/43 |
| 5,412,665 A | * | 5/1995 | Gruodis et al. | 714/739 |
| 5,729,559 A | * | 3/1998 | Bright et al. | 714/786 |

OTHER PUBLICATIONS

"VMS115; high-speed IPSec coprocessor," 2001, http://www.semiconductor.philips.com/pip/VMS115, Royal Philips Electronics, pp. 1-2.
"7951 Security Processor, Broadband Security Bargain Now with PCI Bus," http://www.hifn.com/products/7951.html, Hifn, pp. 1-3.
"7902 Security Processor, Value-Priced Chip Powers High-Speed Small Office VPNs," http://www.hifn.com/products/7902.html, Hifn, pp. 1-3.
"7901 Security Processor, Broadband Security Bargain," http://www.hifn.com/products/7901.html, Hifn, pp. 1-3.
"7814/7854 HIPP Security Processors, Hifn Intelligent Packet Processing-HIPP-Guarantees System Performance," http://www.hifn.com/products/HIPP7814-7854.html, Hifn, pp. 1-4.
"7851 HIPP Security Processor, Faster Routing With Full-Duplex OC-3 To OC-12 Security Processor Performance," http://www.hifn.com/products/7851.html, Hifn, pp. 1-3.
"7811 Security Processor, Announcing Breakneck VPN Packet Performance," http://www.hifn.com/products/7811.html, Hifn, pp. 1-3.
"7711 Security Processor, Interoperate with Everything Compress, Encrypt and Authenticate IPSEC Data Packets," http://www.hifn.com/products/7711.html, Hifn, pp. 1-4.
"VMS113; Crytographic chip," http://www.semiconductors.philips.com/pip/VMS113, pp. 1-2, Royal Philips Electronics.

(Continued)

*Primary Examiner*—Hosuk Song
(74) *Attorney, Agent, or Firm*—Hickman, Palermo, Truong & Becker LLP

(57) ABSTRACT

Techniques for performing multistage processing with feedback include a multi-stage feedback processor comprising a first plurality of processing stages connected in series. A feedback channel connects a last stage to one of the other stages. Each processing stage is configured to process one block of data from a data stream during one processing cycle. A parallel input queue includes a second plurality of input queues connected in parallel to the first stage. The parallel input queue directs a block to the first stage alternately from each of a third plurality of data streams. In an embodiment, the number of data streams is no greater than the number of input queues. This arrangement significantly improves throughput for multistage processing with feedback. The arrangement is suitable for encryption and decryption of network traffic using block-based symmetric ciphers.

25 Claims, 7 Drawing Sheets

OTHER PUBLICATIONS

"BCM5805 Security Processor," Broadcom Corporation, pp. 1-2, 2000, Product Brief.

"BCM5820 Security Processor," Broadcom Corporation, pp. 1-2, 2000, Product Brief.

"BCM5840 Security Processor," Broadcom Corporation, pp. 1-2, 2000, Product Brief.

"Single-Chip Security," Advance Data Sheet, BCM5805, pp. 1-48, Dec. 8, 2000, Broadcom Corporation.

* cited by examiner

METHOD AND APPARATUS FOR MULTI-SESSION TIME-SLOT MULTIPLEXING

FIELD OF INVENTION

The present invention generally relates to data processing involving multistage processing with feedback. The invention relates more specifically to a method and apparatus for multi-session time-slot multiplexing for multistage processing with feedback that provides stronger encryption.

BACKGROUND OF THE INVENTION

Some complex operations used in encryption require more processing than can be performed during a single processing cycle, such as a single clock cycle of the hardware on which the procedure is executing. These procedures are sometimes implemented in multiple stages, each of which can be completed during a single processing cycle. When there are separate processors available to perform each of the stages, as in an array processor, then throughput is enhanced. Throughput is typically measured in bytes of output per second, where a byte is eight binary digits (bits).

Hardware implementations with a separate processing block, module or element for each stage, each specially designed to perform the arithmetic or logic or both required at its stage, often offer the highest throughput. These implementations allow a data block to be processed during a single clock cycle in any stage. The result is then passed as a block of partially processed data to the next stage to be processed at the next stage during the next clock cycle. In ideal circumstances, the first stage can process another block of data while the next stage is processing the block produced by the first stage during the previous cycle.

However, when the procedure also calls for feedback, in which a block of output data from a later stage is combined with a block of input data at an earlier stage, loss of throughput may result, since the next data block cannot be processed until processing of the current block is complete. This loss of throughput is significant in some circumstances. For example, the loss of throughput is a limiting factor in networks in which encryption and decryption are performed by a common device performing as a network interface for a plurality of network servers.

A server is a process executing on a computing device to provide a computer resource in response to a request message received from a client process executing on another computing device. Computer resources include files of data, files of instructions for particular devices, and the functionality of devices such as printers and scanners. The terms server and client also refer to the computing device on which the server process and client process, respectively, execute.

FIG. 1A is a block diagram of a network encryption system for purposes of illustrating a context in which throughput decline caused by feedback in a multi-stage processing system may occur.

In this example, a bank of server devices 140 is connected to a network 125, such as the Internet, through a gateway 130 and links 141*a*–141*e*, which use Transport Control Protocol ("TCP") and Internet Protocol ("IP"). One or more clients 120*a*–120*d* are coupled to network 125 and can request resources from servers 140. Assume, for purposes of illustrating an example, that the system is designed to handle 200 sessions per second per server, where a session is a data stream from a client such as client 120*a*, carried in one or more packets traveling over the network 125. A typical session contains a number of bits that is expected to range from hundreds of bytes to tens of kilobytes. For five servers, this arrangement amounts to 1000 sessions per second that are to be within the capacity of the gateway 130. A practical system may involve hundreds of servers. To satisfy such loads, a high-performance encryption/decryption engine is needed that processes data streams at many billions of bits per second (Gigabits per second, "Gbps"). For example, an encryption/decryption engine with a throughput of 5 Gbps is desirable.

Block-based symmetric encryption/decryption algorithms have been implemented in integrated circuit hardware devices having clock speeds of 125 million cycles per second ("MHz") and that use 16 stages to process 64-bit blocks of data. These procedures also employ feedback in which a 64-bit block of data output by the $16^{th}$ stage is input to the first stage along with the next 64-bit block of data. Commercial integrated circuit chips that implement this engine are available from companies like HiFn, VLSI, Broadcom and others.

FIG. 1B is a block diagram illustrating data undergoing encryption processing using such devices at a particular clock cycle. In FIG. 1B, an input data stream 180 comprising a series of 64-bit blocks travels from left to right. Data blocks on an input queue pass through a first stage 101 and a second stage 102 and intervening stages to a last stage 116, on each successive clock cycle. In one such device, there are 16 stages. The number of bits carried on the paths between stages and queues is known as the channel width 120 and is indicated by a number of bits positioned adjacent to a slash intersecting the path.

Each data block undergoes additional processing that changes its contents as it progresses from one stage to the next. From the last stage 116, the fully processed output block joins an output data stream 190 on an output queue. The fully processed output block is also passed back to the first stage 101 over a feedback channel 119. In the clock cycle illustrated in FIG. 1B, the first, second and third input blocks have passed through the 16 processing stages to become the first, second and third output blocks, 191, 192, 193, respectively. At the clock cycle illustrated, the partially processed fourth block 174 is in the second stage 102. There is no block of data being processed in any of the other stages. The fifth input block 185 waits on the input queue until the fourth block becomes an output block in the last stage 116. The fifth block 185 must wait an additional 14 clock cycles for the fourth block to complete its transit of the 16 stages at the last stage 116.

Because of this feedback requirement, overall data throughput is reduced. Without feedback, a new 64-bit block of output would be produced on each clock cycle, 125 million times per second, for a throughput of 8 Gbps (computed as the product $125 \times 10^6 \times 64$). Because of the feedback requirement, a following block must wait 16 clock cycles for the preceding block to be output before the following block can enter the first stage with the feedback. For example, the fifth input block 185 waits 16 clock cycles for the fourth block to be processed through the last stage 116 before beginning its transit. This reduces throughput 16 times to 0.5 Gbps. As a result, the architecture of FIG. 1B is unsuitable for a gateway with a large number of servers, such as in the example system of FIG. 1A, which are simultaneously serving an even larger number of clients.

Some throughput can be recovered if the clock cycle time is speeded or if more computations can be performed in each cycle at most stages so that one or more stages can be removed. Hardware solutions are typically faster than software solutions. However, hardware speed improvements generally occur as a result of improvements in foundational technologies. Consequently, there appear to be only marginal gains in throughput that can be obtained in the near term by decreasing the number of stages.

Based on the foregoing, there is a clear need for increasing throughput in multi-stage processing systems with feedback in circumstances involving multiple data streams using readily attainable technology.

SUMMARY OF THE INVENTION

The foregoing needs, and other needs that will become apparent for the following description, are achieved in the present invention, which comprises, in one aspect, an apparatus for performing multistage processing with feedback that increases throughput by utilizing the processing stages that are otherwise idle during a processing cycle to process additional data streams. The apparatus includes a multi-stage feedback processor. The multi-stage feedback processor includes a first set of processing stages connected in series and a feedback channel connecting a last stage to another stage. Each processing stage is configured to process one block of data from a data stream during one processing cycle. The apparatus also includes a set of parallel input queues connected in parallel to the first stage. The input queues are configured for directing a block to the first stage alternately from each of a set of data streams.

In one embodiment, the number of data streams is no greater than the number of input queues.

For example, the number of input queues is equal to the number of processing stages.

In another aspect, a method of performing multistage processing with feedback is provided. The method alternately directs a set of data streams to a first processing stage of a set of processing stages connected in series. One data block from one data stream can be processed at one processing stage during one processing cycle. Each interior input block of each data stream is not directed to the first processing stage before a previous data block of the same stream is output from the last processing stage. The previous data block precedes the interior input block in the data stream by a delay number of blocks. The delay is less than the number of processing stages. A data block is an interior data block if it follows the first block in the data stream by the delay.

In an embodiment of this aspect, a number of data streams in the set equals the number of processing stages.

In another embodiment of this aspect, a number of data streams in the set is based on the number of processing stages and the delay number.

In other aspects, the invention encompasses an apparatus and a computer readable medium configured to carry out the foregoing steps.

In another aspect of the invention, a method of designing a multistage processor with feedback to implement a procedure includes identifying a number of stages and a feedback delay number of blocks for the procedure. Provisions are made for connecting the number of stages in series and for a feedback channel connecting a last stage to a first stage. It is determined whether the delay number is less than the number of stages. If the delay number is less, then a number of input queues is determined based on the number of stages and the delay number. Then, also, provisions are made for a parallel input queue having the number of parallel input queues connected in parallel to the first stage.

In another aspect, a method of fabricating a multistage processor includes steps to implement the design.

In another aspect, an apparatus for encrypting or decrypting network messages on a data network includes a network interface that is coupled to the data network for receiving multiple data streams. Multiple processors connected in series are each configured to process a data block from an input stream during one processing cycle. An output block from a last processor is fed back to a first processor of the multiple processors. A parallel input queue having multiple input queues connected in parallel to the first processor directs a data block to the first processor alternately from each of the data streams received from the network interface.

In an embodiment of this aspect, the apparatus also includes a context channel connecting the multiple stages in series and a context buffer. The context buffer includes multiple context registers connected in parallel to the first processor. The context buffer directs context information alternately from each of the context registers to the first stage. The context information is information that each stage needs to process each block, and changes from block to block. For example, context information may comprise encryption keys or initial vector values for use in a block cipher.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for optimized multiple stage processing with feedback is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
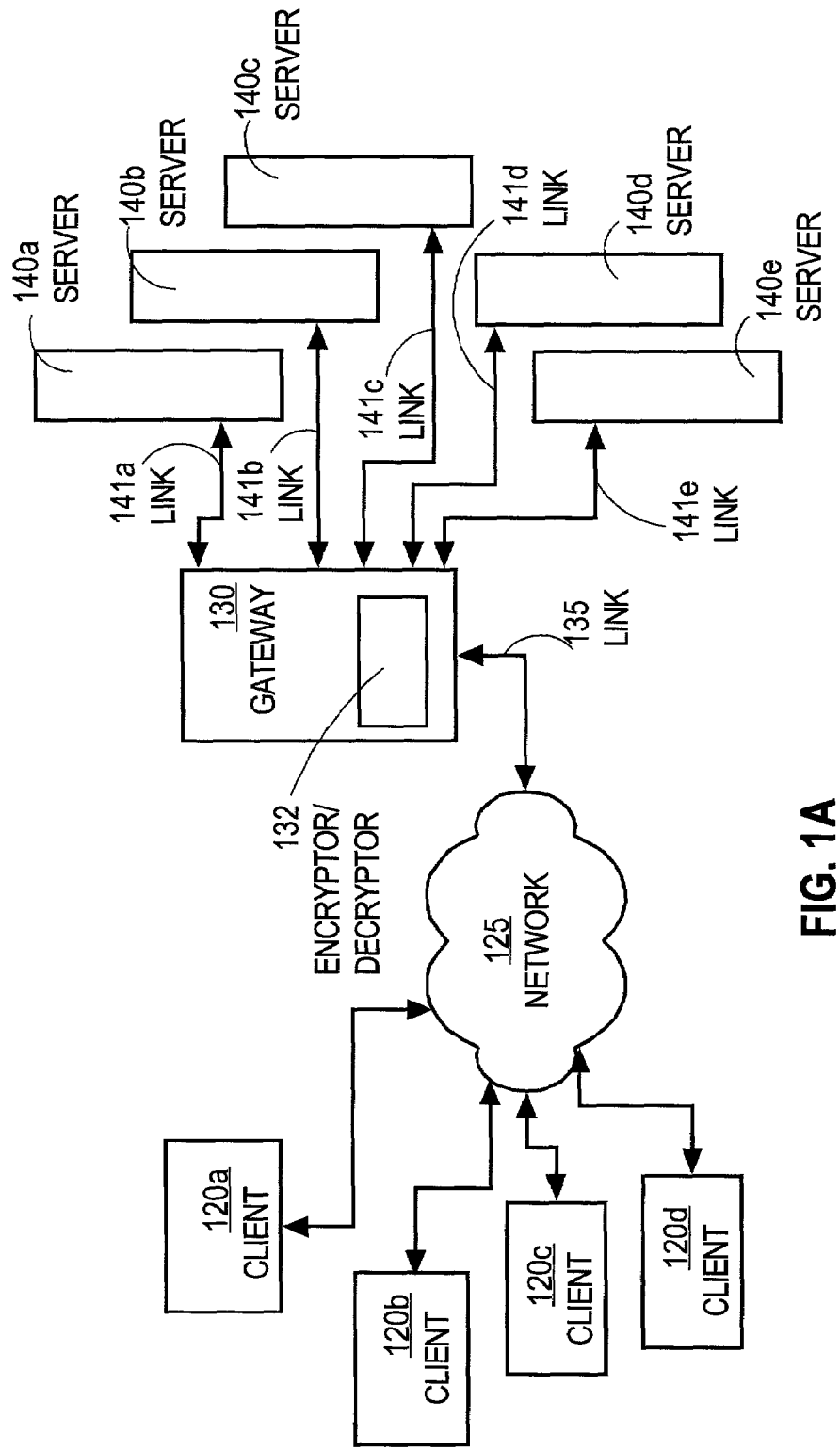
FIG. 1A is a block diagram that illustrates a network encryption system utilizing a multistage processor with feedback.

An embodiment is illustrated for a specific example in which the multistage processor with feedback is part of a symmetric encryption circuit, such as the encryptor/decryptor 132 in FIG. 1A. However, the invention is not limited to this application, and can be applied to any multistage processor with feedback, whether implemented in hardware or software.

In an embodiment, stages in a multistage processing system with feedback, which would remain idle during a processing cycle if a single input data stream were being processed, are employed to process data blocks from additional input data streams.

Structural Overview

Figure 2A:
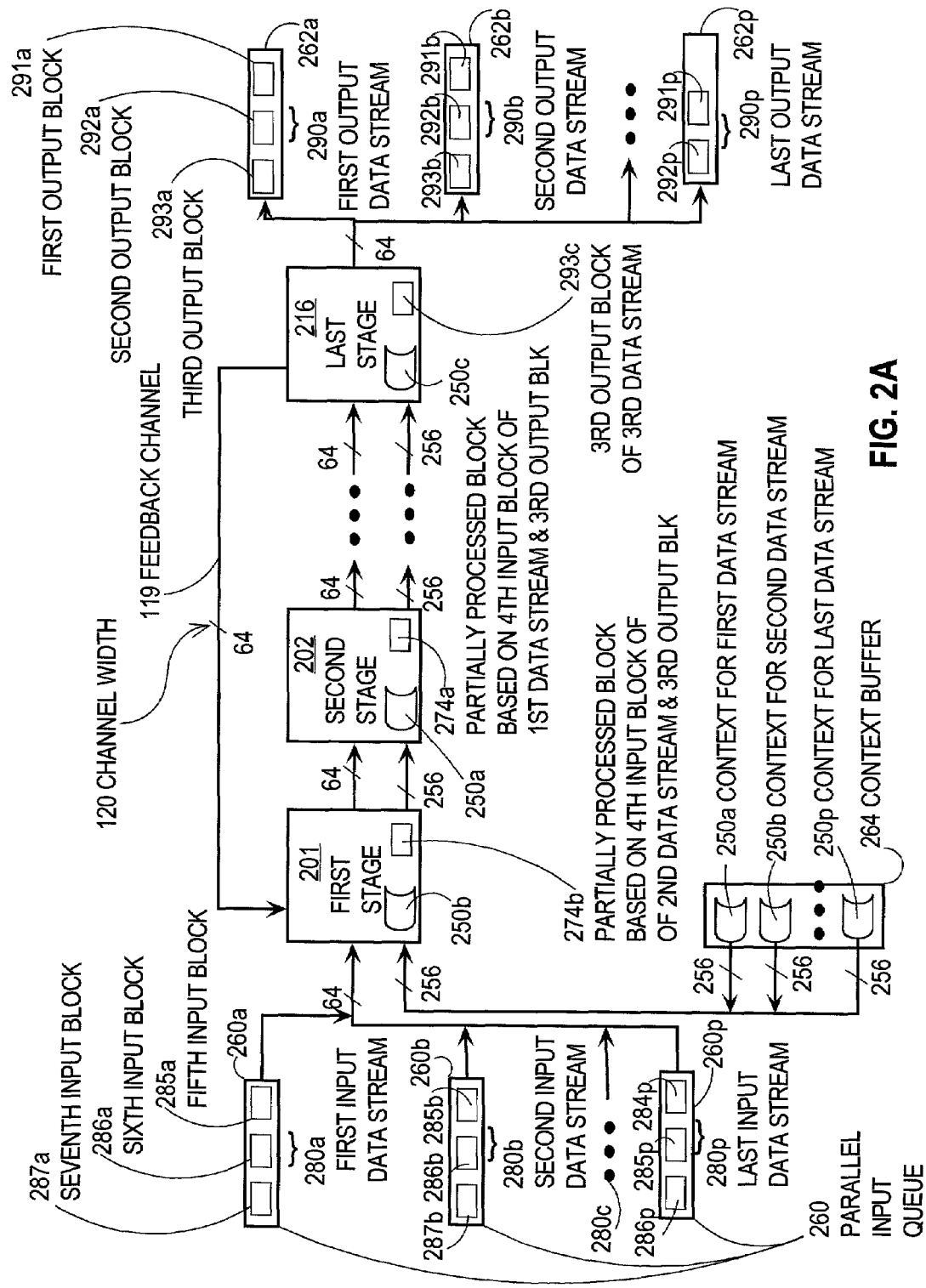
FIG. 2A is a block diagram that illustrates an embodiment of an optimized multistage processor with feedback using time-slot multiplexing of multiple sessions.

FIG. 2A is a block diagram that illustrates an embodiment of an optimized multistage processor with feedback using time-slot multiplexing of multiple sessions. In this embodiment, multiple stages 201–216 are connected in series by 64-bit channels with a 64-bit feedback channel 119 connecting the last stage 216 to the first stage 201.

A plurality of input data streams 280 are alternately directed to the first stage 201 of the multistage processing system. In the illustrated embodiment, the plurality of input data streams 280 pass through a parallel input queue 260 made up of a plurality of input queues, such as input queue 260a, connected in parallel to the first stage 201. Each input data stream is made up of several input data blocks. For example, input stream 280a includes input data blocks 285a, 286a, 287a. Similarly, processed data blocks output by the last stage 216 pass to a parallel output queue 262, made up of a plurality of output queues, such as output queue 262a. For example, output stream 290a includes output data blocks 291a, 292a, 293a.

The multiple stages 201–216 are connected by a 256-bit channel for passing context information, as described further in a later section. The context information for this channel originates in a buffer 264 made up of a plurality of 256-bit registers also connected in parallel to the first stage 201. A channel width of 256 bits is shown only by way of example; any other channel width may be used.

Operational Overview

According to a method of operating the structure described in FIG. 2A, none of the multiple stages 201 through 216 are idle; each is processing a data block from one of the input data streams during every clock cycle. As used here, a processing stage is considered idle if it is not operating on data from any of the input data streams or if the data it does operate on is not included in any of the output data streams. By using a processing stage that would otherwise be idle, if only a single data stream were input, to process data blocks from one or more additional data streams, the throughput of the multiprocessing system with feedback is increased.

For example, data blocks from each of the input queues in a parallel input queue 260 are alternately directed to the first stage 201, a data block from a different input data stream on each clock cycle. At a subsequent clock cycle, each processing stage operates on a block of data from one of the input streams. Thus the last stage 216 outputs a data block from alternating data streams on each clock cycle. The output data block is directed to the corresponding output data stream 290 as well as to the first stage 201 through the feedback channel 119. The total throughput of the system is the total output of the output data streams 290.

With 16 stages and a 125 MHz clock cycle, embodiments offer improved processing efficiency. For example, the illustrated embodiment can add 15 additional input queues to provide data blocks to occupy the 15 stages that would otherwise be idle. To accept the results of the additional input, 15 additional output queues are attached in parallel to the last stage. In this case, the system has a throughput of 8 Gbps (computed as 0.5 Gbps per data stream times 16 data streams).

Example Operation

Figure 1B:
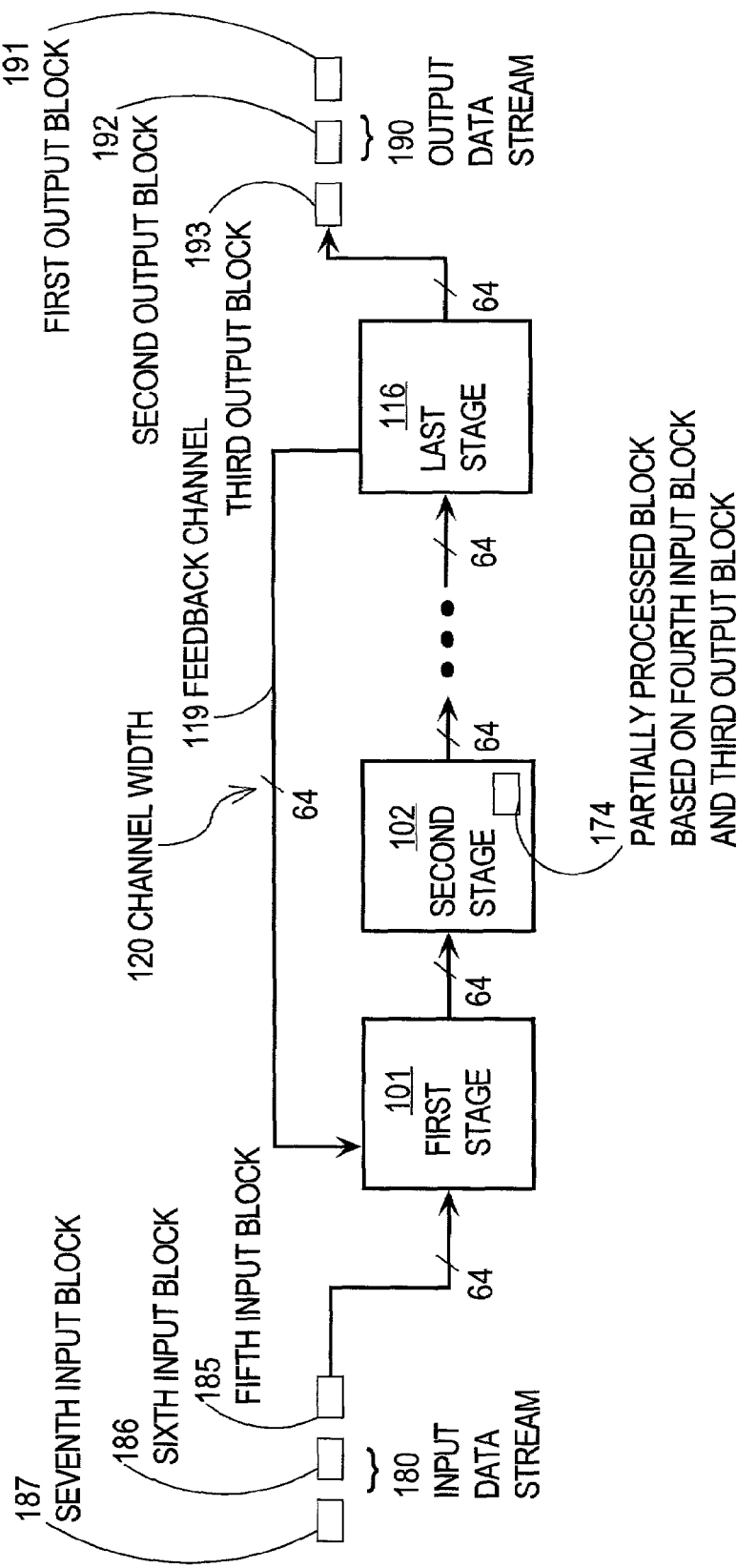
FIG. 1B is a block diagram that illustrates a conventional multistage processor with feedback at a specific clock cycle.

An example is now described showing how data blocks are processed during a clock cycle corresponding to the clock cycle illustrated in FIG. 1B.

In the example operation, each processing stage requires context information describing the input data stream. In the conventional system of FIG. 1B, the context information is available from a context buffer (not shown), from which each stage can retrieve information. In the embodiment illustrated in FIG. 2A, in which data blocks from two different data streams are processed by two different stages, the context information needed by the two stages are different. To make the corresponding context information available to the stage working on a data block, the context information is passed from one stage to the next on each clock cycle on a context channel, for example the 256-bit channel in FIG. 2A. In the case of a multistage processor with feedback employed for symmetric data encryption and decryption, the context information includes the symmetric key. In other embodiments, in which the multistage processing with feedback does not require context information unique to each data stream, the context buffer and context channel is not used. In this case, the associated structures can be omitted.

With respect to the conventional system illustrated in FIG. 1B, consider the processing cycle in which the fourth data block 174 is processed by the second stage 102. Fifty (50) clock cycles have elapsed since the first input block was directed to the first stage 101; 16 clock cycles to produce each of the first output block 191, the second output block 192, and a third output block 193, plus one clock cycle to process the fourth data block in the first stage 101 for output to the second stage 102, and one clock cycle to process the fourth block in the second stage 102. Note that the third output block 193 is output on the same clock cycle that the fourth input block is input to the first stage 101.

On the next clock cycle, the fourth data block and feedback from the third output block is processed by the first stage and output to the second stage.

On the next clock cycle, the fourth data block is processed by the second stage 102 as illustrated in FIG. 1B. That is, the partially-processed fourth block 174, based on the fourth input block, represents the output of the second stage 102. During this 50th clock cycle, the other 15 stages are idle, including the first stage 101, and the last stage 116. After these 50 clock cycles, only three 64-bit data blocks, totaling 192 bits, have been output.

Referring now to FIG. 2A, the partially processed fourth block 274a, based on the fourth input block of the first data stream, is being output from the second stage 202. However the first stage 201 is not idle, but is processing data block 274b, the fourth data block of the second data stream. The parallel input queue 260 is alternately directing a data block from each of the data streams 280 on the input queues. Similarly, the parallel output queue 262 is alternately directing a data block from the last stage 216 to each of the output data streams 290 on the output queues.

For example, on the 48th clock cycle the parallel input queue 260 directed the fourth input data block of the first input data stream 280a to the first stage 201, just as the last stage 216 outputs the third output data block 293a of the same first data stream to output queue 262a and feedback channel 119. On the 49th clock cycle, the parallel input queue 260 directed the fourth input data block of the second input data stream 280b to the first stage 201, just as the last stage 216 outputs the third output data block 293b of the same second data stream to output queue 262b, and feedback channel 119.

On the 50th clock cycle, the parallel input queue 260 directs the fourth input data block of the third input data stream 280c to the first stage 201, just as the last stage 216 outputs the third output data block 293c of the same third data stream to parallel output queue 262 and feedback channel 119. The feedback is synchronized with the input for the same data stream. Also on the $50^{th}$ clock cycle, the parallel output queue 262 directs the third output data block 293c of the third data stream to a third output queue.

Because the fourth data block 274b of the second data stream currently resides in the first stage 201, the input queues for the third to the last data stream still contain the fourth data block of their respective data streams. For example, the fourth input data block 284p of the last input data stream 280p still resides on the last input queue 260p. Similarly, because the third output data block 293c of the third data stream currently is being directed from the last stage 216 to the third output queue, the output queues for the fourth through the last data streams only contain the first two data blocks of their respective data streams. For example, the last output queue 262p contains only the first output data block 291p and the second output data block 292p of the last output data stream 290p.

If necessary, context data is passed to the first stage with the corresponding data stream, as shown in FIG. 2A. For example, context information 250b for the second data stream was passed from a context buffer 264 to the first stage 201 during the 49th clock cycle, when the fourth data block 274b of the second data stream was passed to the first stage 201. The context information is passed from stage to stage on the 256-bit context channel when the corresponding data block is passed on the 64-bit channel after each clock cycle. For example, the context information 250a for the first data stream was passed from the first stage 201 to the second stage 202 at the 49th cycle. As a result, in the last stage 216, which is processing the third data block from the third data stream, the context information 250c for the third data stream is available.

According to this method of operation, after these fifty (50) clock cycles, thirty-five (35) 64-bit data blocks, totaling 2,240 bits, have been output. This is much greater than the three 64-bit data blocks and 192 bits output by the conventional system. The 35 data blocks include two output data blocks for each of the sixteen data streams, comprising 32 blocks, plus an additional output data block from each of the first three data streams. This is an order of magnitude improvement in throughput and has a significant impact on systems such as illustrated in FIG. 1A with encryption and decryption circuits for a plurality of servers in which throughput is a limiting factor.

This arrangement works especially well for circumstances in which there are a large number of sessions generating independent data streams, such as those found in a typical server farm that services millions of client requests. If, at any time, the number of streams falls below the number of stages, then the data streams present are distributed on a subset of the input queues. In this case, some of the input queues are empty. Consequently some stages will be idle during any clock cycle. However, this only occurs where there are so few sessions that the multistage processor is not a bottleneck.

Alternative Embodiments with Multiple Delay Feedback

The example given above illustrates the improvement provided by the current invention in multiple stage systems with feedback in which output on the last stage for one data block is combined at the first stage with the next data block in a given data stream. In other feedback schemes, the output from last stage for a particular data block may be combined not with the next data block but with a later subsequent data block in the same data stream.

In some circumstances, it may be advantageous to complete the processing of some data streams before others. Using the techniques of the embodiment described above, the number of data streams processed equals the number of processing stages. For example, if there are 16 processing stages, then 16 data streams are alternately directed to the first and subsequent stages. In this case, sixteen data streams of the same length, involving, for example, hundreds of data blocks, could possibly finish at roughly the same time, within the last 16 clock cycles.

If it is preferable to finish processing one of the data streams as soon as possible, rather than to spread the processing power evenly across a number of data streams equal to the number of processing stages, and if the feedback delay is greater than one, then a different number of input data streams and input data queues on the parallel queue are preferable.

For example, if the output for a leading data block is fed back to the first stage for combination with the data block following by two data blocks, then the feedback delay is said to be two data blocks. In the example given in the previous section, the feedback delay was one data block. If the feedback delay is two data blocks, then the intervening one data block is not required to wait for the output from the leading data block before being directed to the first stage. In this case, two of the stages may process a leading data block and the one intervening data block. If there are 16 stages, as in the illustrated examples, then two of the stages are not idle, and 14 stages are idle.

In this case, it may be desirable to direct only enough data streams to the multiple stages to occupy the idle stages. For example, if each data stream occupies two of the sixteen stages, then the sixteen stages can process eight data streams without increasing the wait time of the first data stream. If the embodiment described in the previous section is used, then 16 data streams are passed through the multiple stages. No additional throughput is achieved by the additional 8 data streams, and, in fact, the time to finish processing the first data stream is increased by a factor of two.

In addition, using the embodiment described in the previous section, the data block on the feedback channel 119 would not arrive at the first stage 201 at the same time as the two block delayed data block, but instead, arrive at the same time as the one block delayed data block. To ensure that the output data block on the feedback Channel 119 is scheduled for the first stage 201 at the proper time, additional registers would be needed on the feedback channel to hold the output until the proper data block on the same data stream arrives at the first stage. In the example, sixteen feedback hold registers would be needed on the feedback channel to maintain the output block until the two block delayed data block arrives at the first stage.

In the case of multiple delay feedback, an alternative embodiment of the present invention has advantages. In this alternative embodiment, the number of input queues in the parallel input queue is determined based on both the number of stages and the delay number of blocks. The number of output queues in the parallel output corresponds to the number of input queues.

For example, the number of queues may be determined from the quotient of the number of stages divided by the delay number of blocks. If there are 16 stages and a delay of two blocks, then the quotient is 8, and this design calls for eight input queues connected in parallel to the first stage 201 and eight output queues connected in parallel to the last stage 216.

If the quotient is a whole number (integer) with no remainder, then the quotient gives the number of input queues and no feedback hold registers are needed on the feedback channel. Naturally, the number of output queues equals the number of input queues.

If there is a remainder, then the number of input queues is the next greatest integer, in this example. This choice is made in order to leave no stages idle. In this case, the number of feedback hold registers on the feedback channel equals the difference between the remainder and the delay number of blocks. One output block sent to one of the feedback hold registers is advanced to the next feedback hold register with each subsequent clock cycle. The feedback hold registers delay the arrival of the output block from the last stage to the first stage by the number of registers. Naturally, the number of output queues equals the number of input queues.

In other embodiments, a different relationship between the number of queues and the number of stages and the delay number of blocks are used. For example, the number of additional queues is set equal to the number of idle stages, which equals the difference between the number of stages and the delay number of blocks.

Figure 2B:
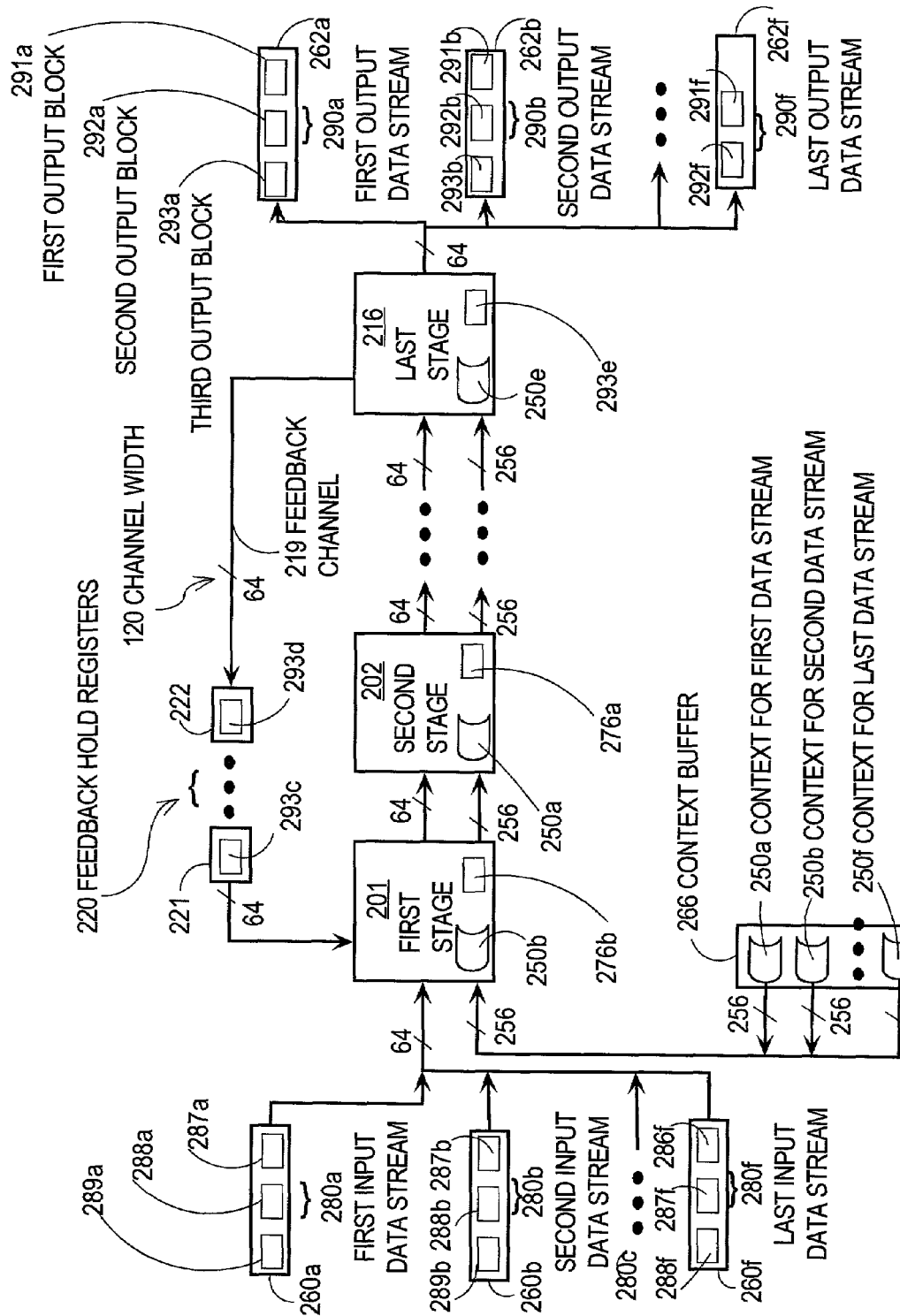
FIG. 2B is a block diagram that illustrates another embodiment of an optimized multistage processor with feedback using time-slot multiplexing of multiple sessions.

FIG. 2B is a block diagram that illustrates the alternative embodiment of an optimized multistage processor with multiple delay feedback using time-slot multiplexing of multiple sessions. It differs from the embodiment illustrated in FIG. 2A, by using fewer input queues in parallel to the first stage than there are stages in the multistage processor. Similarly, there are fewer output queues connected in parallel to the last stage 216 than there are stages in the multistage processor. In addition, this embodiment may include one or more feedback hold registers 220 in the feedback channel 219.

FIG. 2B is used to illustrate an example where there is a remainder to the quotient of the number of stages divided by the delay number of blocks. For this example, there are 16 stages and the feedback delay is three blocks. The quotient of sixteen divided by three is five with a remainder of one. To avoid idle stages, the number of input queues is set equal to six, the next greatest integer to the quotient five. These are represented by input queues 260a through 260f. An equal number of output queues are represented by output queues 262a through 262f. In this case, the number of feedback hold registers is two, the difference between the three delay blocks and the remainder of one. The two delay blocks 221 and 222 are on feedback channel 219.

According to this example, six data streams are fed alternately into the first stage 201. On the clock cycle in which the third data block 293e of the fifth data stream is in the last stage 216, the sixth data block 276a of the first data stream is in the second stage 202, and the sixth data block 276b of the second data stream is in the first stage 201. The next input data block to be directed to the first stage 201 is therefore the sixth data block 286c of the third data stream.

The two output blocks immediately preceding the third output block 293e, currently in the last stage 216, are in the two feedback hold registers 221 and 222. These output blocks are the third output block 293c of the third data stream and the third output block 293d of the fourth data stream, respectively.

That is, the third output block 293c of the third data stream, in hold register 221, is directed to the first stage 201 simultaneously with the sixth input block 286c of the third data stream. Therefore the output from the third data block is synchronized to be fed back after a delay of three data blocks to combine with the input from the sixth data block on the same data stream.

This arrangement provides the advantage of avoiding idle stages while synchronizing the feedback using the fewest possible feedback hold registers in the feedback channel. Therefore the smallest possible delay is introduced into completing any data stream while still avoiding any idle stages.

A Method for Designing and Building a Multistage Processor with Feedback

Figure 3:
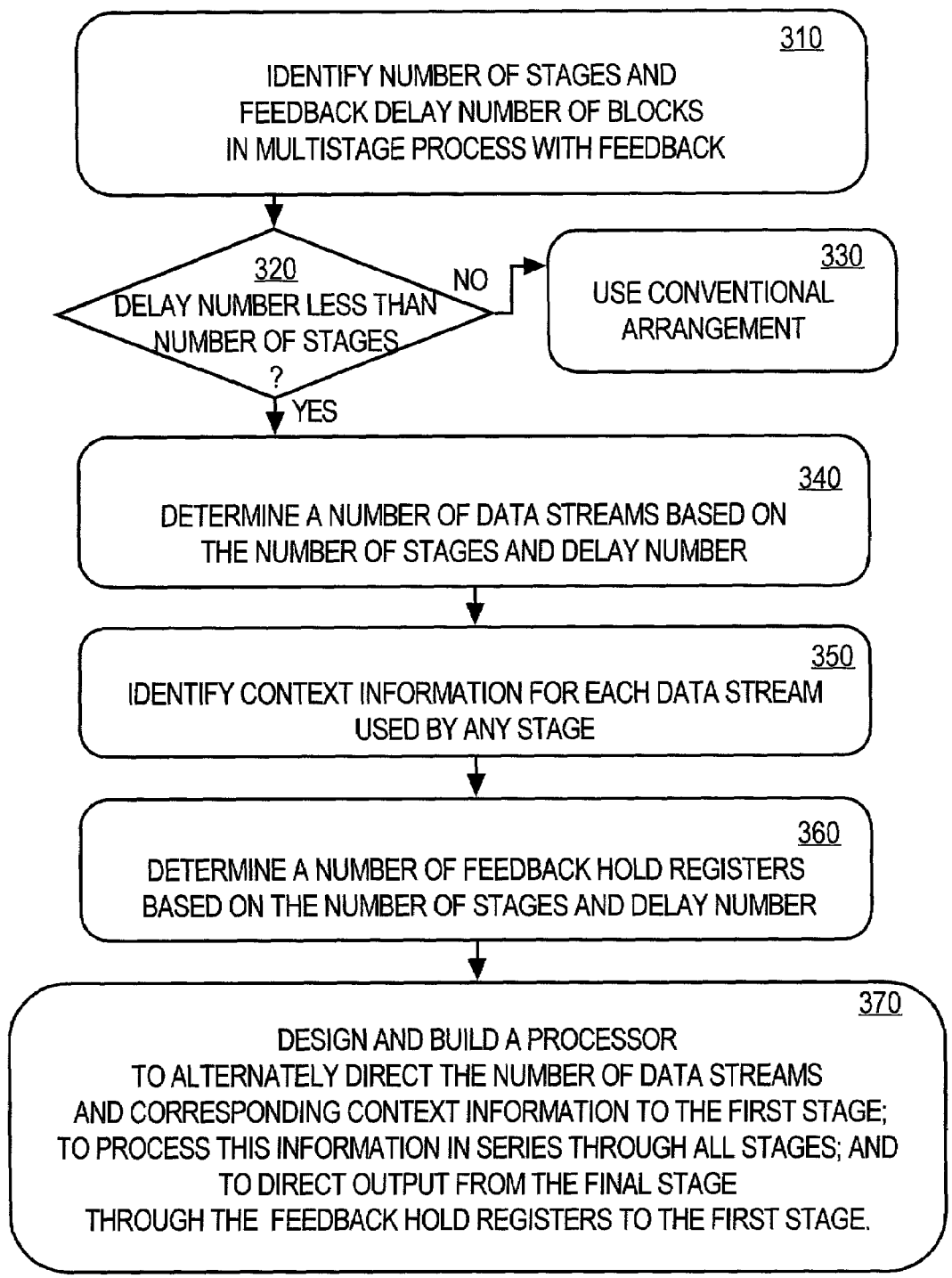
FIG. 3 is a flowchart that illustrates a high level overview of one embodiment of a method for designing and building an optimized multistage processor with feedback.

FIG. 3 is a flowchart that illustrates a high level overview of one embodiment of a method for designing and building an optimized multistage processor with feedback.

In step 310, the procedure to be implemented is inspected to identify the number of stages and the feedback delay expressed in number of data blocks. In step 320, it is determined whether the feedback delay number of blocks is less than the number of stages. If not, then the conventional approach can be used, as indicated in step 330.

If the feedback delay number of blocks is less than the number of stages, then control passes to step 340 in which a number of input queues is determined based on the number of stages and the feedback delay number of blocks. For example, the number of input queues, and also the number of output queues, are set to the quotient of the number of stages divided by the feedback delay number of blocks, rounded out to the next greatest integer if there is a remainder.

In step 350, context information is identified that is constant for all data blocks on the same data stream and needed by any one of the processing stages. If so, a context buffer and a context channel between stages is desirable.

In step 360, the number of feedback hold registers is determined based on the number of stages and the delay number. For example, in this system described in the example of the previous section, where the delay number is three and a remainder of the quotient is one, the number of feedback hold registers is set equal to the difference, which is two in the example.

In step 370, elements are provided for in the design to connect the number of input queues in parallel to the first processing stage, to process the information in a data block in series through all the stages, and direct the output on the final stage through the feedback hold registers to the first stage as well as directing the output alternately to the number of output queues. Also in step 370, an apparatus, such as a chip, is built with the elements provided for in the design.

Method of Operating a Multistage Processor with Feedback

Figure 4:
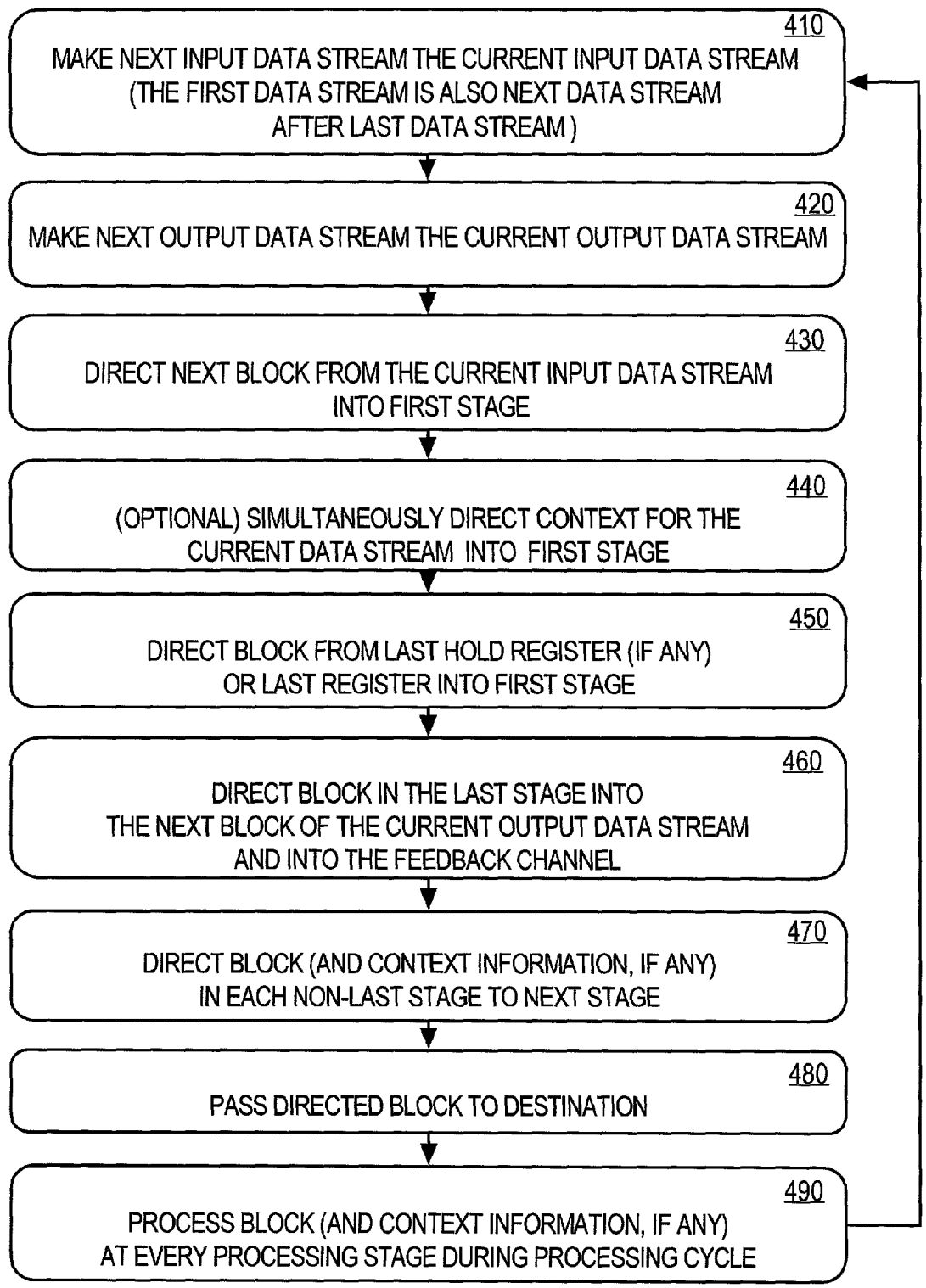
FIG. 4 is a flowchart that illustrates one embodiment of a method for operating an optimized multistage processor with feedback.

FIG. 4 is a flowchart that illustrates one embodiment of a method for operating an optimized multistage processor with feedback.

In step 410, the next input data stream is made the current input data stream. For example, in hardware, every input stream is placed on a corresponding input queue connected in parallel with the other input queues to the first processing stage. The data blocks are spaced apart by a number of clock cycles equal to the number of input queues. The timing of a data block's arrival at the head of the queue is offset by one clock cycle on each succeeding input queue. In this manner, the data block at the head of the parallel queue alternates from one data stream on one queue to the next with succeeding clock cycles. In software, for example, the step is accomplished by incrementing the pointer to an array of references representing the input data streams.

In step 420, the next output data stream is made the current output data stream. For example, in hardware, the voltage is fixed on every output for a time corresponding to the number of clock cycles equal to the number of queues in the parallel output queue. The start of the fixed voltage is offset by one clock cycle on the succeeding output queue. Consequently the removal of the fixed voltage is offset by one clock cycle on each succeeding output queue. The output queue without fixed voltage has its signal determined by the data in the last stage, and consequently becomes the next output queue for receiving the next output data stream. Other methods can be used to alternately direct the output from the last stage to the next output queue. In software, for example, the step is accomplished by incrementing the pointer to an array of references representing the output data streams.

In step 430, the next data block from the current input data stream is directed into the first stage. In hardware, this is automatically accomplished with a parallel connection to the first stage and staggered data blocks described with the example in step 410. In software, this is done with an assignment instruction using the incremented pointer, for example.

In step 440, context information for the current data stream is also directed into the first stage. This step is optional in that it might not be performed for some multi-stage processing procedures with feedback. However, for the embodiment involving symmetric key encryption and decryption, context information is provided in step 440 and includes the symmetric key.

In step 550, the data block in the hold register farthest removed from the last stage is directed into the first stage. In hardware, this is automatically accomplished in a feedback channel that is connected from the last stage to the first stage through the hold registers, if any.

In step 460, the data block in the last stage is directed onto the next block of the current output data stream. In hardware, this is accomplished automatically, for the example described in step 420, by connecting the output queues in parallel to the last processing stage. In addition, in step 460, the data block in the last stage is directed into the feedback channel.

In step 470, the processed data block from each stage, except the last stage, is directed to the next stage. If context information is needed, it also is passed to the next stage. In hardware, this is accomplished automatically by the data block channel and the context channel connecting the output of one stage to the input of the following stage. In software, for example, this is implemented in a loop over all the stages.

In step 480, the data blocks are passed to the destinations to which they were directed. In hardware, this occurs, for example, upon the rise or fall of a clock cycle voltage.

In step 490, the data block passed to each processing stage is processed according to the structure of the processing stage. In hardware, for example, each stage is implemented as an integrated circuit. In software, for example, each stage is implemented as a subroutine or method of an object. After step 490 is completed, control passes back to step 410 to make the next input data stream the current input data stream.

Hardware Overview

Figure 5:
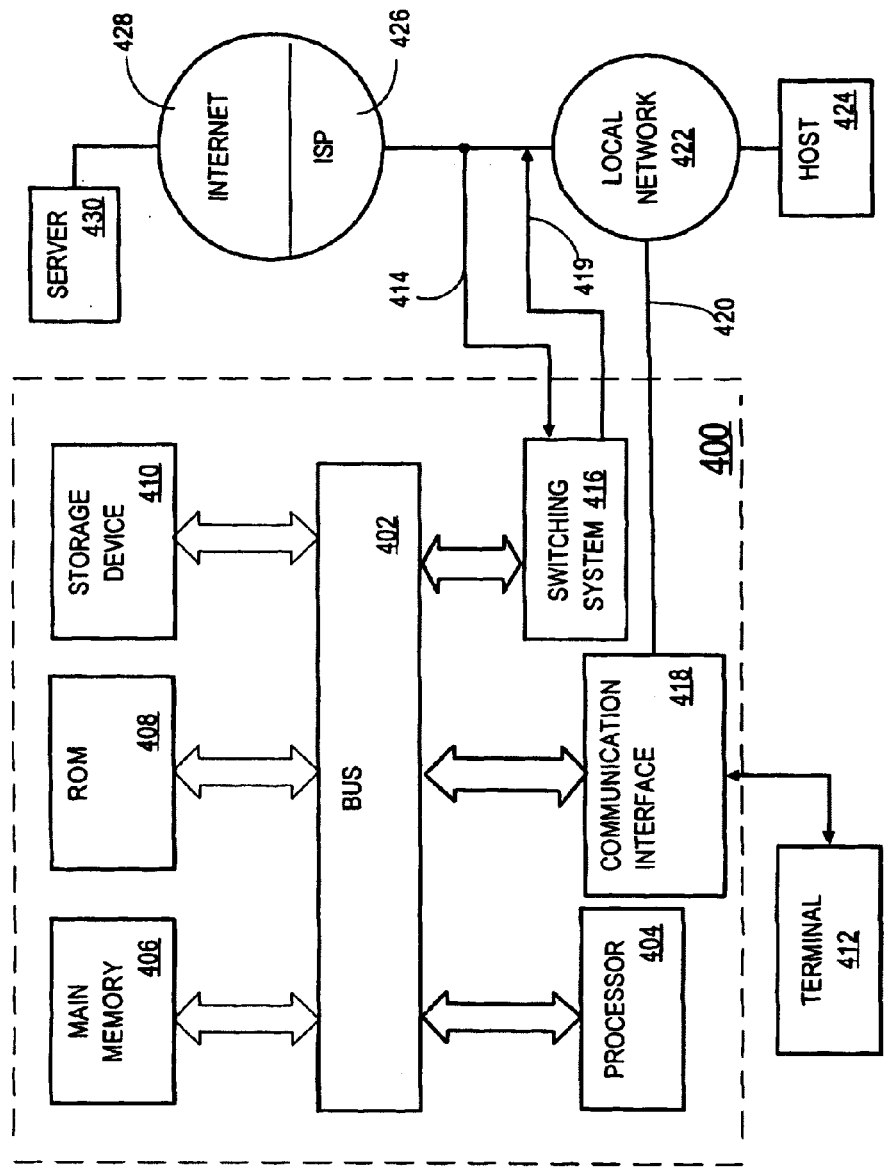
FIG. 5 is a block diagram that illustrates a router upon which an embodiment may be implemented.

FIG. 5 is a block diagram that illustrates a computer system 500 upon which an embodiment of the invention may be implemented. The preferred embodiment is implemented using one or more computer programs operating one or more application specific integrated circuits (ASICs) in a network element such as a router device. In this embodiment, one ASIC includes multiple hardware stages with a feedback channel and a context channel. In this embodiment, the computer system 500 is a router acting as a gateway.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for multi-session time-slot multiplexing for multistage processing with feedback that is useful in network encryption. According to one embodiment of the invention, multi-session time-slot multiplexing for multistage processing with feedback that is useful in network encryption is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for multi-session time-slot multiplexing for multistage processing with feedback that is useful in network encryption as described herein.

The received code may be executed by processor 504 as it is received, and/or stored in storage device 510, or other non-volatile storage for later execution. In this manner, computer system 500 may obtain application code in the form of a carrier wave.

CONCLUSIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for performing multistage processing with feedback, comprising:
    a first plurality of processing stages connected in series and having a feedback channel connecting a last stage of the first plurality to one of the processing stages among the first plurality of processing stages, wherein each processing stage of the first plurality is configured to process one block of data from a data stream during one processing cycle; and
    a parallel input queue comprising a second plurality of input queues connected in parallel to the first stage wherein each of the input queues has an output coupled to the first stage and each of the input queues has an input coupled to a different data stream among a third plurality of data streams, and configured to direct a data block to the first stage alternately from each of the third plurality of data streams.

2. An apparatus as recited in claim 1, wherein the number of input queues in the second plurality is no greater than a number of processing stages in the first plurality.

3. An apparatus as recited in claim 1, wherein
    a block on the feedback channel based on an input block on a particular data stream is combined with a later block of the particular data stream that is a delay number of blocks after the input block; and
    a number of input queues in the second plurality is based on the delay number and a number of processing stages in the first plurality.

4. An apparatus as recited in claim 1, further comprising a parallel context array comprising a second plurality of context registers connected in parallel to the first stage, for directing context information from a context register to the first stage during a processing cycle with an associated data stream on a corresponding input queue.

5. An apparatus as recited in claim 4, wherein the first plurality of processing stages implement an encryption process and the context information associated with the data stream comprises an encryption key for the data stream.

6. An apparatus as recited in claim 3, wherein the feedback channel comprises a set of one or more feedback hold registers for synchronizing the block on the feedback channel to be directed to the first stage during a processing cycle when the later block is directed to the first stage.

7. An apparatus as recited in claim 1, further comprising a parallel output queue comprising a second plurality of output queues connected in parallel to the last stage, for directing a block from the last stage alternately to each of a third plurality of output streams, each output stream corresponding to a respective data stream of the third plurality of data streams.

8. A method of performing multistage processing with feedback, the method comprising the step of directing alternately to a first processing stage of a first plurality of processing stages connected in series, a second plurality of data streams, wherein:
   the second plurality of data streams is queued in a third plurality of parallel input queues each having an input coupled to a different one of the data streams and having an output coupled in parallel to the first processing stage;
   one data block from one data stream can be processed at one processing stage during one processing cycle;
   each interior input block of each data stream is not directed to the first processing stage before an output block based on a previous input data block from the data stream is output from the first plurality of processing stages;
   the previous input data block precedes the interior input block in the data stream by a delay number of blocks less than a number of processing stages in the first plurality; and
   the interior block follows the delay number of blocks counting from a beginning of the data stream.

9. A method as recited in claim 8, wherein a number of data streams in the second plurality is equal to the number of processing stages in the first plurality.

10. A method as recited in claim 8, wherein a number of data streams in the second plurality is based on the number of processing stages and the delay number.

11. A method as recited in claim 8, further comprising the step of directing to the first processing stage, with each data stream, context information associated with the data stream.

12. A method as recited in claim 11, wherein the first plurality of processing stages implement an encryption process and the context information is an encryption key.

13. A computer-readable medium carrying one or more sequences of instructions for performing multistage processing with feedback, which instructions, when executed by one or more processors, cause the one or more processors to carry out the step of directing alternately to a first processing stage of a first plurality of processing stages connected in series, a second plurality of data streams; wherein
   the second plurality of data streams is queued in a third plurality of parallel input queues each having an input coupled to a different one of the data streams and having an output coupled in parallel to the first processing stage;
   one data block from one data stream can be processed at one processing stage during one processing cycle,
   each interior input block of each data stream is not directed to the first processing stage before an output block based on a previous input data block from the data stream is output from the first plurality of processing stages
   the previous input data block precedes the interior input block in the data stream by a delay number of blocks less than a number of processing stages in the first plurality, and
   the interior block follows the delay number of blocks counting from a beginning of the data stream.

14. An apparatus for performing multistage processing with feedback, comprising:
   means for processing a data block sequentially through a first plurality of processing stages connected in series during a corresponding number of clock cycles;
   means for feeding an output block from a last stage of the first plurality back to a first stage of the first plurality; and
   means for directing a data block to the first stage alternately from each of a third plurality of data streams on a parallel input queue comprising a second plurality of input queues connected in parallel to the first stage, wherein each of the input queues has an output coupled to the first stage and each of the input queues has an input coupled to a different data stream among the third plurality of data streams.

15. An apparatus for encrypting or decrypting network messages on a data network, comprising:
   a network interface that is coupled to the data network for receiving a plurality of data streams therefrom;
   multiple processors connected in series and configured to process a data block from an input stream during one processing cycle in one processor; and to feed an output block from a last processor back to a first processor; and
   a parallel input queue comprising a plurality of input queues connected in parallel to the first processor for directing a data block to the first processor alternately from each of the plurality of data streams, wherein each of the input queues has an output coupled to the first processor and each of the input queues has an input coupled to a different data stream among the plurality of data streams.

16. An apparatus as recited in claim 15, further comprising:
   a context channel connecting the multiple processors in series; and
   a context buffer comprising a plurality of context registers connected in parallel to the first processor for directing context information alternately from each of the context registers to the first stage.

17. An apparatus as recited in claim 16, wherein the context information comprises a symmetric block cipher encryption key associated with the data block.

18. An apparatus as recited in claim 16, wherein the context information comprises one or more initial vector values associated with the data block for use as input to a symmetric block cipher that encrypts the data block.

19. A computer-readable medium carrying one or more sequences of instructions for performing multistage processing with feedback, which instructions, when executed by one or more processors, cause the one or more processors to carry out the steps of:
   creating and storing a first plurality of processing stages that are connected in series and having a feedback channel connecting a last stage of the first plurality to one of the processing stages among the first plurality of processing stages;

creating and storing a parallel input queue comprising a second plurality of input queues connected in parallel to a first stage among the processing stages, wherein each of the input queues has an output coupled to the first stage and each of the input queues has an input coupled to a different data stream among a third plurality of data streams;

processing one block of data from a data stream during one processing cycle using each processing stage of the first plurality;

directing a data block to the first stage alternately from each of the third plurality of data streams.

20. A computer-readable medium as recited in claim 19, wherein the number of input queues in the second plurality is no greater than a number of processing stages in the first plurality.

21. A computer-readable medium as recited in claim 19, further comprising instructions for carrying out the steps of:
combining a block on the feedback channel based on an input block on a particular data stream with a later block of the particular data stream that is a delay number of blocks after the input block;
creating and storing a number of input queues in the second plurality that is based on the delay number and a number of processing stages in the first plurality.

22. A computer-readable medium as recited in claim 21, further comprising instructions for carrying out the steps of creating and storing, as part of the feedback channel, a set of one or more feedback hold registers for synchronizing the block on the feedback channel to be directed to the first stage during a processing cycle when the later block is directed to the first stage.

23. A computer-readable medium as recited in claim 19, further comprising instructions for carrying out the steps of:
creating and storing a parallel context array comprising a second plurality of context registers connected in parallel to the first stage;
directing context information from a context register to the first stage during a processing cycle with an associated data stream on a corresponding input queue.

24. A computer-readable medium as recited in claim 23, further comprising instructions for carrying out the steps of:
implementing an encryption process in the first plurality of processing stages;
creating and storing an encryption key for the data stream as the context information associated with the data stream.

25. A computer-readable medium as recited in claim 19, further comprising instructions for carrying out the steps of: creating and storing a parallel output queue comprising a second plurality of output queues connected in parallel to the last stage; and directing a block from the last stage alternately to each of a third plurality of output streams, each output stream corresponding to a respective data stream of the third plurality of data streams.

* * * * *

UNITED STATES PATENT AND TRADEMARK OFFICE
CERTIFICATE OF CORRECTION

| | | |
|---|---|---|
| PATENT NO. | : 7,162,034 B1 | Page 1 of 1 |
| APPLICATION NO. | : 09/753281 | |
| DATED | : January 9, 2007 | |
| INVENTOR(S) | : Christophe Joly and Muhammad Raghib Hussain | |

It is certified that error appears in the above-identified patent and that said Letters Patent is hereby corrected as shown below:

Title Page, Item (56)
In Other Publications:

On first publication listed, line 2, replace "conductor.philips.com/pip/VMS115," with -- conductors.philips.com/pip/VMS115, --

In the claims:

Claim 22, Column 17, line 1, replace "21" with -- 19 --

Signed and Sealed this

Fourteenth Day of August, 2007

JON W. DUDAS
*Director of the United States Patent and Trademark Office*